Oct. 31, 1933.  N. H. RICKER  1,932,481
TEMPERATURE CONTROL ATTACHMENT FOR PLUNGER LIFT DEVICES
Filed Feb. 13, 1932
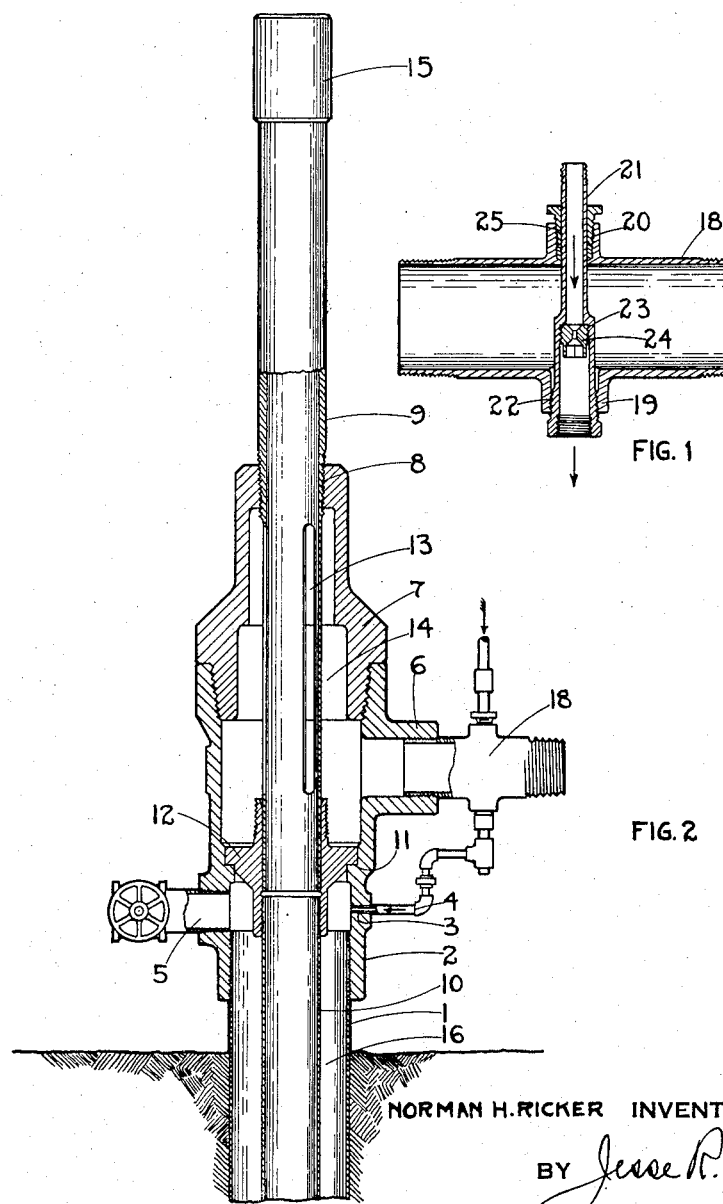
NORMAN H. RICKER INVENTOR Patented Oct. 31, 1933

1,932,481

UNITED STATES PATENT OFFICE 1,932,481

TEMPERATURE CONTROL ATTACHMENT FOR PLUNGER LIFT DEVICES

Norman H. Ricker, Houston, Tex., assignor to Hughes Tool Company, Houston, Tex., a corporation of Texas Application February 13, 1932. Serial No. 592,824

3 Claims. (Cl. 103—52)

My invention relates to plunger lift devices and has particular application to the feed line by means of which the pressure fluid is allowed to enter the well casing.

In fluid lift devices the liquid in the well is raised to the surface by means of a swab plunger which is moved with its load of liquid from the lower end of the eduction tube to the surface by means of air or gas pressure. Where gas from the well is produced in insufficient quantities to raise the plunger with its load of liquid, gas or air is introduced from the surface and provision is made to restrict the flow of gas through the inlet pipe to the well so that it will enter at a uniform rate sufficient to maintain the fluid pressure in the well and to lift the plunger, but preventing its sudden rush to the well and to the eduction tube when the plunger discharges its load. By restricting this pressure fluid by passing it through a small orifice, expansion of the gas at the orifice will result in freezing of liquid carried thereby particularly when the atmospheric temperature is not far above freezing.

It is an object of my invention to extend the inlet pipe for the pressure fluid through the liquid outlet pipe in such manner that it may be maintained at a proper temperature during the cold weather when the inlet line is liable to be choked up at the control orifice due to expansion of the gas and resulting freezing.

I desire to locate the choke orifice in the inlet gas lines at a point where it is subjected to the temperature of the liquid flowing from the well thereby maintaining the gas line at the point where expansion occurs at a temperature above freezing and thus preventing the clogging of the orifice.

In the drawing herewith Fig. 1 is a vertical section through a portion of the flow line and illustrating the extending of the gas line transversely of the flow line.

Fig. 2 is a side view of the upper end of a plunger lift installation with my invention applied thereto, certain parts being broken away in vertical section.

The upper end of the well casing is shown at 1. It is connected to a flow head 2 having a lateral inlet at 3 for the gas line 4. On the opposite side of the flow head is a lateral port 5 which is normally closed but which may be used in emergencies as a flow line if such becomes desirable. Toward the upper end of the flow head is the liquid outlet port 6.

The upper end of the flow head is closed by a bonnet 7, the upper end of which is threaded at 8 to connect with the extension 9 upon the eduction tube 10.

The interior of the flow head is formed with a lateral shoulder 11 to support the head 12 on the eduction tube 10. The extension 9 of the eduction tube fits closely within the head and is slidable therein for purpose of assembly. The said extension has lateral outlets 13 leading to the chamber 14 within the flow head thus allowing the passage of liquid from the tube at the outlet 6. The upper end of the extension 9 is closed by the cap 15.

The gas line 4 is the line through which the supply of gas under pressure is introduced to the chamber 16 between the tubing and the eduction tube. My improvement consists of extending this gas line transversely through the flow line for the liquid being pumped.

In my preferred form of apparatus for accomplishing this, I employ a fitting 18 in the flow line. This fitting has opposite connections 19 and 20 thereon to receive a flow nipple 21. As will be seen from Fig. 1, I have one end of said nipple enlarged and threaded at 22 to engage within the threaded seat in the port 19. Between the ends of the nipple, the diameter of the same is reduced at 23 and threaded to receive a choke member 24. The reduced end of the nipple is extended through a stuffing box 25 in the port 20. The lower end of the nipple is connected to the inlet line 4 previously noted.

The gas or air under pressure which is fed into the casing is compelled to pass through the choke member 24. This choke is arranged with an orifice of sufficient diameter to regulate the passage of gas to the well at the desired rate and it is to be understood that this choke member may be changed as desired to suit the particular size of orifice necessary under the circumstances. By placing this choke member in the nipple 21 extending transversely of the flow line, the temperature may be maintained at the temperature of the liquid being pumped, and will, therefore, be above the freezing point and the freezing of the fluid passing through the control choke member 24 will be avoided.

In this way I am enabled to supply gaseous pressure fluid to the well at a uniform slow rate and in sufficient quantities to operate the plunger lift without the danger of the control orifice being continually choked through freezing of liquid therein during cold weather.

Having described my invention, what I claim is:

1. In a plunger lift device including a flow head, an eduction tube therein, a flow line connected with said flow head to receive the liquid from said eduction tube, a gas line through which pressure fluid may be introduced into said flow head, said gas line being associated with said flow line, and a control choke member in said gas line positioned to be subjected to the temperature of the liquid in said flow line.

2. In a plunger lift device having a flow head, an eduction tube discharging therethrough to the flow line, the method of discharging gaseous fluid to said flow head and into the well including controlling the flow by restricting the inlet opening to a predetermined size and regulating the temperature of the fluid passing through said inlet so that freezing at the opening may be prevented.

3. In a plunger lift device having a flow head, an eduction tube discharging therethrough to the flow line, the method of discharging gaseous fluid to said flow head and into the well including controlling the flow by restricting the inlet opening to a predetermined size and regulating the temperature of the gaseous fluid at said inlet opening by subjecting it to the temperature of the fluid in said flow line.

NORMAN H. RICKER.